US007702342B2

(12) United States Patent
Duan (10) Patent No.: US 7,702,342 B2
(45) Date of Patent: Apr. 20, 2010

(54) METHOD AND SYSTEM FOR IMPLEMENTING A MESSAGE SERVICE BASED ON IP MULTIMEDIA SUBSYSTEM (75) Inventor: Xiaoqin Duan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 478 days.

(21) Appl. No.: 11/697,129

(22) Filed: Apr. 5, 2007

(65) Prior Publication Data

US 2007/0243876 A1 Oct. 18, 2007

Related U.S. Application Data (63) Continuation of application No. PCT/CN2006/000870, filed on Apr. 29, 2006.

(30) Foreign Application Priority Data

Apr. 29, 2005 (CN) .................. 2005 1 0069422

(51) Int. Cl.
H04W 4/00 (2009.01)
(52) U.S. Cl. .................. 455/466; 455/445; 370/352; 370/392; 370/338; 370/349; 709/206; 709/227
(58) Field of Classification Search .............. 370/328, 370/352, 331, 465, 389, 395.2, 466, 338, 370/351, 471, 392; 455/557, 466, 455, 435.1, 455/441, 574, 412.1, 456.1–456.3; 709/227, 709/230, 238
See application file for complete search history.

(56) References Cited

U.S. PATENT DOCUMENTS

2004/0156394 A1* 8/2004 Westman .................. 370/471

(Continued)

FOREIGN PATENT DOCUMENTS

CN 1407759 4/2003

(Continued)

OTHER PUBLICATIONS

3GPP, "Decision on Method for Forwarding Messages," 3GPP TSG-SA2, Meeting #45 (2005).

(Continued)

*Primary Examiner*—Nick Corsaro
*Assistant Examiner*—Chuong A Ngo
(74) *Attorney, Agent, or Firm*—Slater & Matsil, L.L.P.

(57) ABSTRACT

Methods for implementing a message service based on IP Multimedia Subsystem (IMS) are disclosed in embodiments of the invention. One of the methods includes: determining a network domain of a called subscriber according to information in a message service of a calling subscriber; conducting the message service according to a type of the network domain of the called subscriber. Systems for implementing a message service based on IMS, IMS-based Serving-Call Session Control Function (S-CSCF), and IP-Short Message-Gateway are disclosed in the embodiments of the invention. The invention facilitate the network domain of calling side to select different processing procedures for the called subscriber information in different network domains by deciding the network domain of called subscriber, which makes the interworking procedure between an IMS-based message and a non-IMS-based message service clearer and the interworking procedure between an IMS-based message and the traditional short message more perfect.

27 Claims, 8 Drawing Sheets

U.S. PATENT DOCUMENTS

| | | | | |
|---|---|---|---|---|
| 2004/0186913 | A1 | 9/2004 | Xie | 709/238 |
| 2005/0002407 | A1 | 1/2005 | Shaheen et al. | 370/401 |
| 2005/0282565 | A1* | 12/2005 | Shaheen | 455/466 |
| 2006/0206504 | A1* | 9/2006 | Cai et al. | 707/100 |

FOREIGN PATENT DOCUMENTS

| | | |
|---|---|---|
| WO | WO 02/104057 | 12/2002 |
| WO | WO 2004/075507 | 9/2004 |

OTHER PUBLICATIONS

3GPP, "3$^{rd}$ Generation Partnership Project; Technical Specification Group Services and System Aspects; Support of SMS and MMS Over Generic 3GPP IP Access; Release 7," 3GPP TR 23.804 v1.1.0 (2005).

3GPP, "3$^{rd}$ Generation Partnership Project; Technical Specification Group Services and System Aspects; IP Multimedia Subsystem (IMS); Stage 2 (Release 6)," 3GPP TS 23.228 v6.9.0 (2005).

3GPP, "3$^{rd}$ Generation Partnership Project; Technical Specification Group Services and System Aspects; Support of SMS and MMS Over Generic 3GPP IP Access (Release 7)," 3GPP TR 23.804 v7.1.0 (2005).

European Search Report for Application No. 06722428.7-2413, dated Oct. 31, 2007.

International Preliminary Report on Patentability for International Application No. PCT/CN2006/000870, dated Oct. 30, 2007.

International Search Report for International Application No. PCT/CN2006/000870, dated Aug. 10, 2006.

Written Opinion for International Application No. PCT/CN2006/000870, dated Aug. 10, 2006.

* cited by examiner

METHOD AND SYSTEM FOR IMPLEMENTING A MESSAGE SERVICE BASED ON IP MULTIMEDIA SUBSYSTEM

CROSS-REFERENCE TO RELATED APPLICATIONS

This is a continuation of International Application No. PCT/CN2006/000870 filed Apr. 29, 2006, which claims the benefit of Chinese Patent Application No. 200510069422.5, filed Apr. 29, 2005, the entire respective disclosures of which are hereby incorporated herein by reference.

BACKGROUND OF THE INVENTION

1. Field of the Technology

The invention relates to the field of network communication technology, and particularly to methods and systems for implementing a message service based on IP Multimedia Subsystem (IMS), IMS-based Serving-Call Session Control Function (S-CSCF), IP-Short Message-Gateway (IP-SM-GW).

2. Background of the Technology

Along with development of broadband networks, mobile communications go beyond traditional voice communication. Multimedia services in association with various media types, such as audio, video, picture and text, will be developed gradually. By combining with such data services as presence, short message, WEB browsing, location information, PUSH and file sharing services, mobile communications can meet various demands of mobile subscribers.

Driven by various applications, standardization organizations of 3rd Generation Partnership Project (3GPP) and 3rd Generation Partnership Project 2 (3GPP2) put forward an architecture based on IMS successively, the objective thereof is to provide a standardized open architecture in mobile networks to implement various multimedia applications, and provide mobile subscribers with more choices and experiences.

In 3GPP Release 5 (R5), an IMS domain is introduced. The IMS domain is overlaid on the Packet Switched (PS) domain network and includes Call Session Control Function (CSCF), Media Gateway Control Function (MGCF), Media Resources Function (MRF) and Home Subscriber Server (HSS) etc. The CSCF may be categorized into S-CSCF, Proxy-CSCF (P-CSCF) and Interrogating-CSCF (I-CSCF). The S-CSCF is a service switching center of IMS for executing session control, maintaining session status, managing user information and generating charging information, and so on. The P-CSCF, as an access point from which a terminal subscriber accesses the IMS, is used for registering a subscriber, controlling the Quality of Service (QoS) and conducting the security management, and so on. The I-CSCF is responsible for interworking between the IMS domains, managing assignment of the S-CSCF, hiding the network topology and the configuration information from the outside and generating billing data, and so on. The MGCF implements the interworking between an IMS network and other networks by controlling gateways. The MRF is used for providing media resources, such as receiving and playing voices, coding and decoding as well as multimedia conference bridges. The HSS is a user database which stores subscription data and configuration information of IMS subscribers, and so on.

Since the architecture of IMS network is independent of the bearer network of lower level, the IMS network defined by the 3GPP may be applied to other packet networks apart from the packet domain network defined by the 3GPP, such as a packet network, a Wireless Local Area Network (WLAN) and a Next Generation Network (NGN) defined in the 3GPP2, such that the IMS network is independent of the types of terminals and the types of access networks. Therefore, the IMS may be applied to networks and applications related to the 3GPP, and also may be applied to other types of services and applications of access networks and bearer networks. In this way, the IMS provides the future multimedia applications with a universal service enablement platform, which is an important step of system evolution to All IP Network services providing system.

At present, the 3GPP defines two kinds of IMS-based message service: an Immediate Message service and a Session Based Message service.

The method for implementing the Immediate Message service is hereinafter described in detail with reference to the accompanying drawings.

Figure 1:
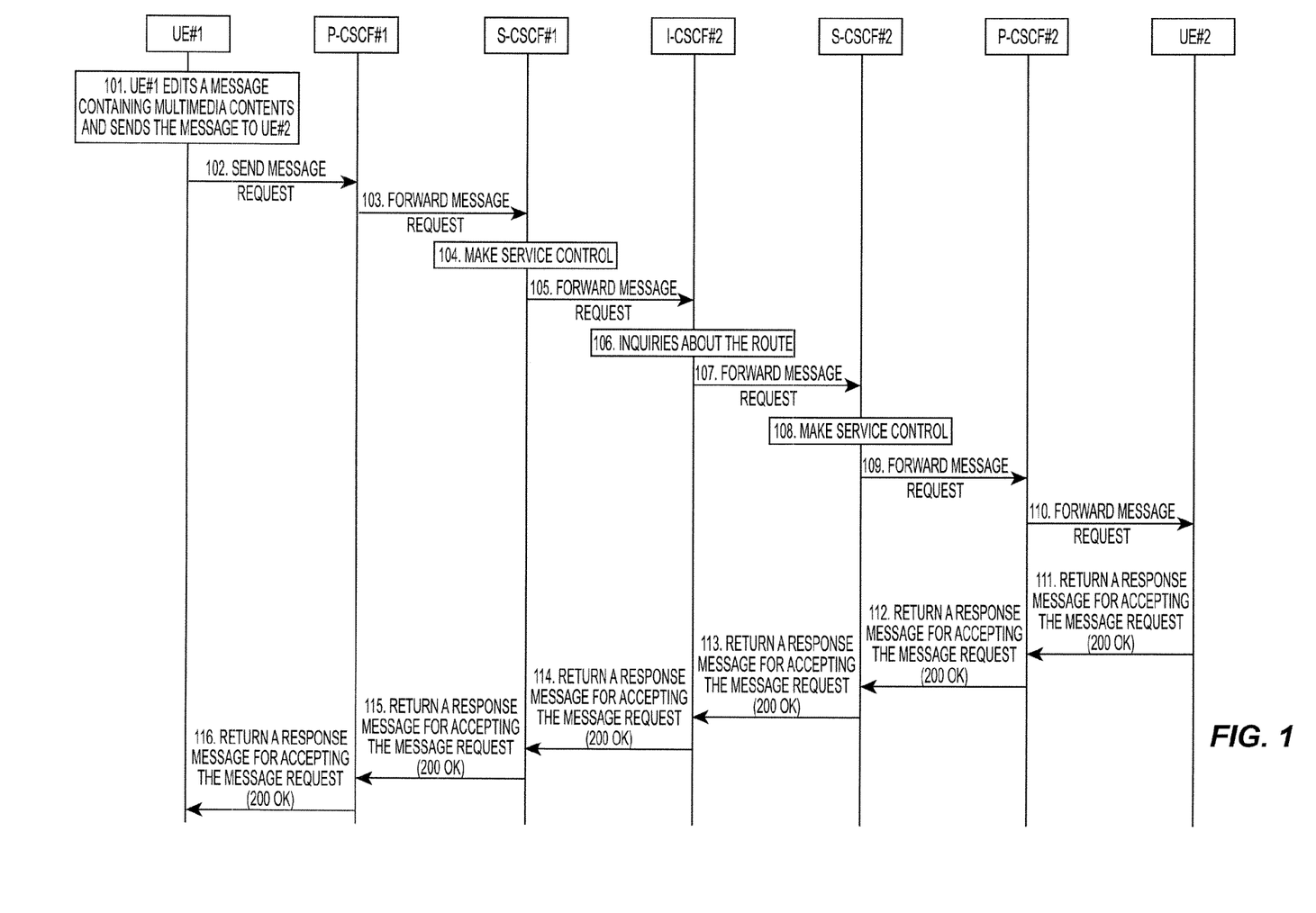
FIG. 1 is a first simplified flowchart for implementing a message service between an IMS-based calling subscriber and an IMS-based called subscriber.

When a called subscriber UE#2 has registered in the IMS domain, a process of sending an immediate message from an IMS-based calling subscriber UE#1 to UE#2 is as shown in FIG. 1, which includes the following steps.

Step 101. UE#1 edits a message containing multimedia contents and needs to send the message to UE#2 (UE#1 generates the multimedia content to be sent).

Step 102 UE#1 sends to a P-CSCF#1 corresponding to UE#1 a MESSAGE request, the multimedia contents edited by UE#1 is contained in a message body of the MESSAGE request.

Step 103. P-CSCF#1 implements the MESSAGE request to an S-CSCF#1 in which UE#1 currently registers.

Step 104. S-CSCF#1 implements Service control.

To be specific, S-CSCF#1 checks a length and a type of the message in the MESSAGE request according to an operator strategy configured in S-CSCF#1. Besides, S-CSCF#1 may trigger a service logic matching the MESSAGE request according to service logics to which UE#1 has subscribed; for example, the MESSAGE request is routed to an Application Server (AS) for the subsequent processing.

Step 105. S-CSCF#1 forwards the MESSAGE request to I-CSCF-#2. In this step, S-CSCF#1 determines I-CSCF#2 according to information related to called subscriber contained in the MESSAGE request.

Step 106. I-CSCF#2 inquires about the route (Location Query procedure with HSS), i.e. requests address information of S-CSCF of UE#2 from an HSS. The address information of S-CSCF of UE#2 is the address information of S-CSCF#2.

Step 107. I-CSCF#2 forwards the MESSAGE request to S-CSCF#2.

Step 108. S-CSCF#2 implements Service control.

To be specific, S-CSCF#2 checks a length and a type of the message in the MESSAGE request according to an operator strategy configured in S-CSCF#2; besides, S-CSCF#2 may trigger a service logic matching the MESSAGE request, for example, the MESSAGE request is routed to an AS for the subsequent processing. If it is impossible to deliver the message when an activated service currently exists in UE#2, such as a service for hiding son kind of messages, the AS may return an error response to S-CSCF#2.

Step 109. S-CSCF#2 forwards the MESSAGE request to the current P-CSCF#2 of UE#2.

Step 110. Upon receiving the MESSAGE request. P-CSCF#2 forwards the MESSAGE request to UE#2; UE#2 displays multimedia contents to the terminal Subscriber (UE#2 renders multimedia content).

Steps 111 to 116. UE#2 returns to UE#1 a response message (200 OK) for accepting the MESSAGE request.

Figure 2:
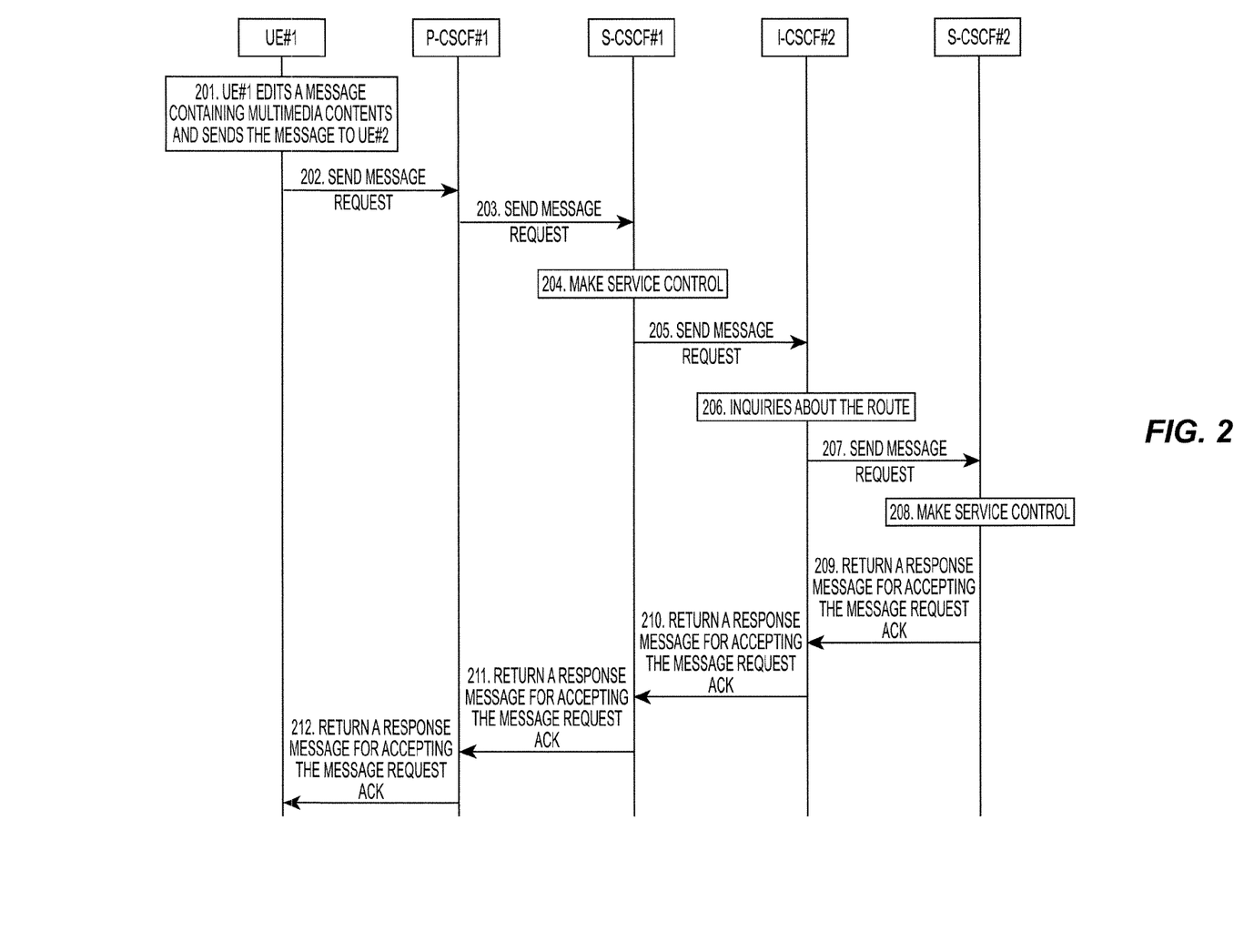
FIG. 2 is a second simplified flowchart for implementing a message service between an IMS-based calling subscriber and an IMS-based called subscriber.

When UE#2 has not registered in the IMS domain but has subscribed to a "service of unregistered state", a process of sending an immediate message from an IMS-based calling subscriber UE#1 to a called subscriber UE#2 is as shown in FIG. 2, which includes the following steps.

Step 210. UE#1 edits a message containing multimedia contents and needs to send the message to UE#2.

Step 202. UE#1 sends to a P-CSCF#1 corresponding to UE#1 a MESSAGE request, the multimedia contents edited by UE#1 is contained in a message body of the MESSAGE request.

Step 203. P-CSCF#1 forwards the MESSAGE request to S-CSCF#1 in which UE#1 currently registers.

Step 204. S-CSCF#1 checks a length and a type of the message in the MESSAGE request according to an operator strategy configured in S-CSCF#1; besides, S-CSCF#1 may trigger a service logic matching the MESSAGE request, for example, the MESSAGE request is routed to an AS for the subsequent processing.

Step 205. S-CSCF#1 forwards the MESSAGE request to I-CSCF#2.

Step 206. I-CSCF#2 inquires about the route, i.e. I-CSCF#2 requests the address information of the S-CSCF corresponding to UE#2 from an HSS; the address information of the S-CSCF corresponding to UE#2 is the address information of S-CSCF#2.

At this point, since UE#2 has not registered in the IMS domain, the HSS checks whether the unregistered UE#2 has subscribed to a "service of unregistered state", if so, the HSS designates a certain S-CSCF as S-CSCF#2 and returns the address information of this S-CSCF#2 to I-CSCF#2; alternatively, the HSS returns the required capability information of S-CSCF to I-CSCF#2, and I-CSCF#2 selects an appropriate S-CSCF as S-CSCF#2 by itself Then, I-CSCF#2 forwards the MESSAGE request to S-CSCF#2; after receiving the MESSAGE request and downloading the data related to UE#2 from the HSS according to the subscriber identifier of UE#2, S-CSCF#2 triggers the matched service control logic according to the "service of unregistered state" to which the subscriber has subscribed, and forwards the MESSAGE request to an AS; the AS makes the subsequent processing. If the subscriber has not subscribed to a "service of unregistered state", the HSS returns a route-inquiring failure response.

Step 207. I-CSCF#2 towards the MESSAGE request to S-CSCF#2.

Step 208. S-CSCF#2 checks a length and a type of the message in the MESSAGE request according to an operator strategy configured in S-CSCF#2, and further checks whether an activated service that will stop the message being delivered exists, such as an activated service for hiding some kind of messages. Besides, S-CSCF#2 may trigger a service logic matching the MESSAGE request, for example, the MESSAGE request is routed to an AS for the subsequent processing. Eventually, the MESSAGE request is sent to UE#2.

Steps 209 to 212. S-CSCF#2 returns to UE#1 the response message for accepting the MESSAGE request returned from UE#2.

Figure 3:
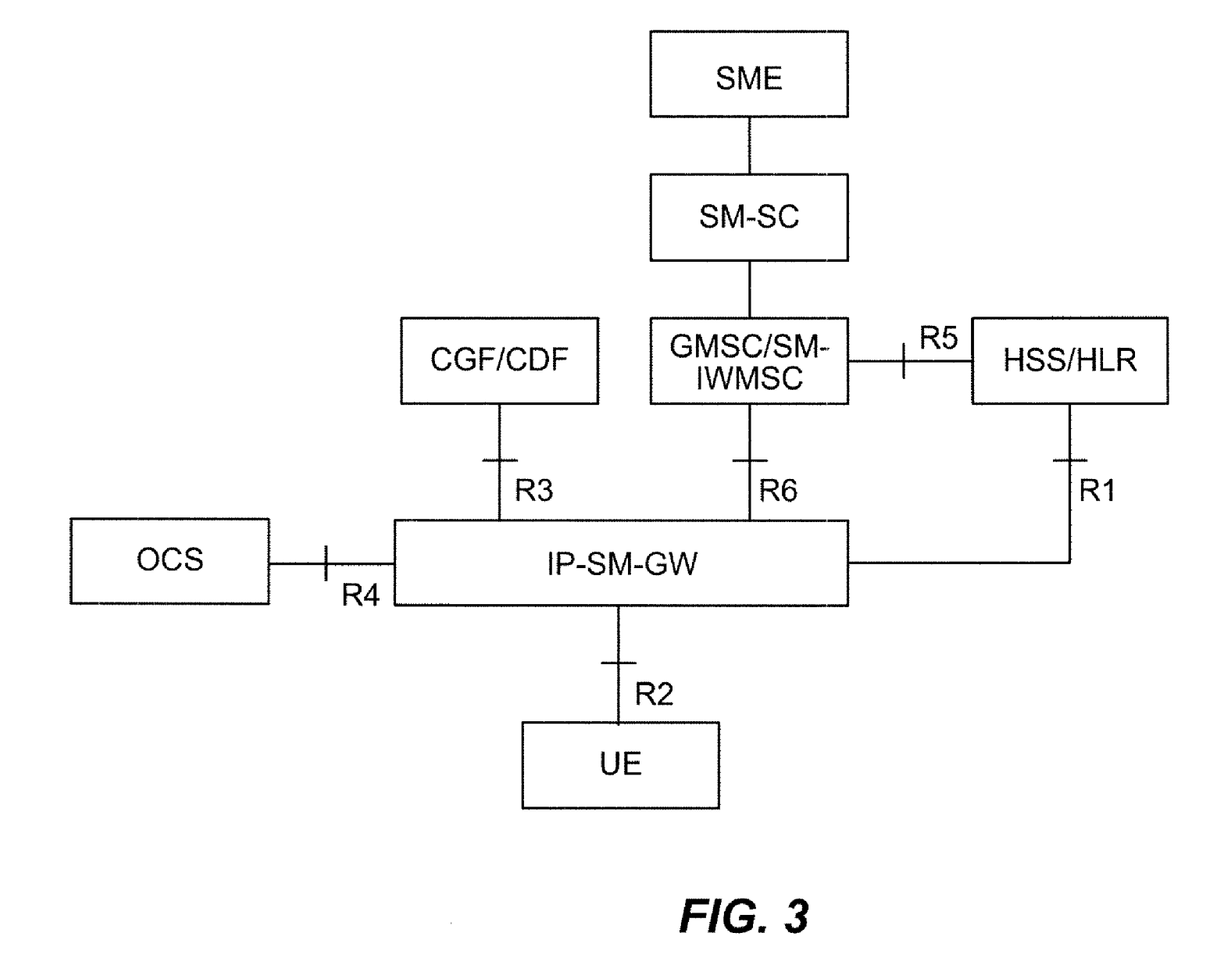
FIG. 3 is a schematic diagram illustrating the network architecture of interworking between an IMS-based message service and a traditional short message service.

At present, the 3GPP sets forth a network architecture illustrating the interworking between an IMS-based message service and the traditional short message service, which is as shown in FIG. 3.

In FIG. 3, the Short Message Entity (SME), Short Message-Service Center (SM-SC), Gateway Mobile Switch Center/Short Message-InterWorking Mobile Switch Center (GMSC/SM-IWMSC), Home Subscriber Server/Home Location Register (HSS/HLR), Charging Gateway Function/ Charging Data Function (CGF/CDF) and Online Charging System (OCS) are function entities for implementing short message service (SMS) in the existing mobile networks.

The SM-SC is used for storing short messages; the GMSC is used for inquiring routing information) from the HSS/HLR when a mobile subscriber is receiving a short message; the SM-IWMSC is used for checking whether a short message is allowed to be sent to its home SM-SC when a mobile subscriber is roaming. The short message centers used in mobile networks integrate SM-SC, GMSC and SM-IWMSC into one device, rather than implement these services by three independent physical devices. Therefore, the short message center hereinafter represents a network device integrated with SM-SC GMSC and SM-IWMSC.

The HSS/HLR is used for storing the data information of a mobile subscriber including routing information; the CGF/CDF is used for collecting and processing offline charging bill information of mobile subscriber and transferring the offline charging bill information to the charging center; the OCS is used for collecting and processing the online charging bill information of mobile subscriber and transferring the online charging bill information to the charging center.

The IP-SM-GW illustrated in FIG. 3 is a newly added network entity which facilitates the interworking between message protocols of IP network and the existing short message protocols of Wide-band Code Division Multiple Addressing/Globe System for Mobile Communication (WCDMA/GSM) network to implement communications between IP User Equipment (UE) and a GMSC/SM-IWMSC.

When using an immediate short message service, a UE based on Session Initial Protocol (SIP) has to register in an IP-SM-GW firstly; the IP-SM-GW notifies the HSS that the UE has registered and the address of IP-SM-GW; the HSS stores the state of IP subscriber as IP Connected, and stores the address of IP subscriber and the address of IP-SM-GW to which the IP subscriber has registered.

A variety of methods for establishing a secure connection between a UE and an IP-SM-GW have been proposed in the present standards, the methods include a manner based on the secure architecture of General Authentication Architecture (GAA), a manner based on the network architecture of IMS and a tunnel-based manner.

Figure 4:
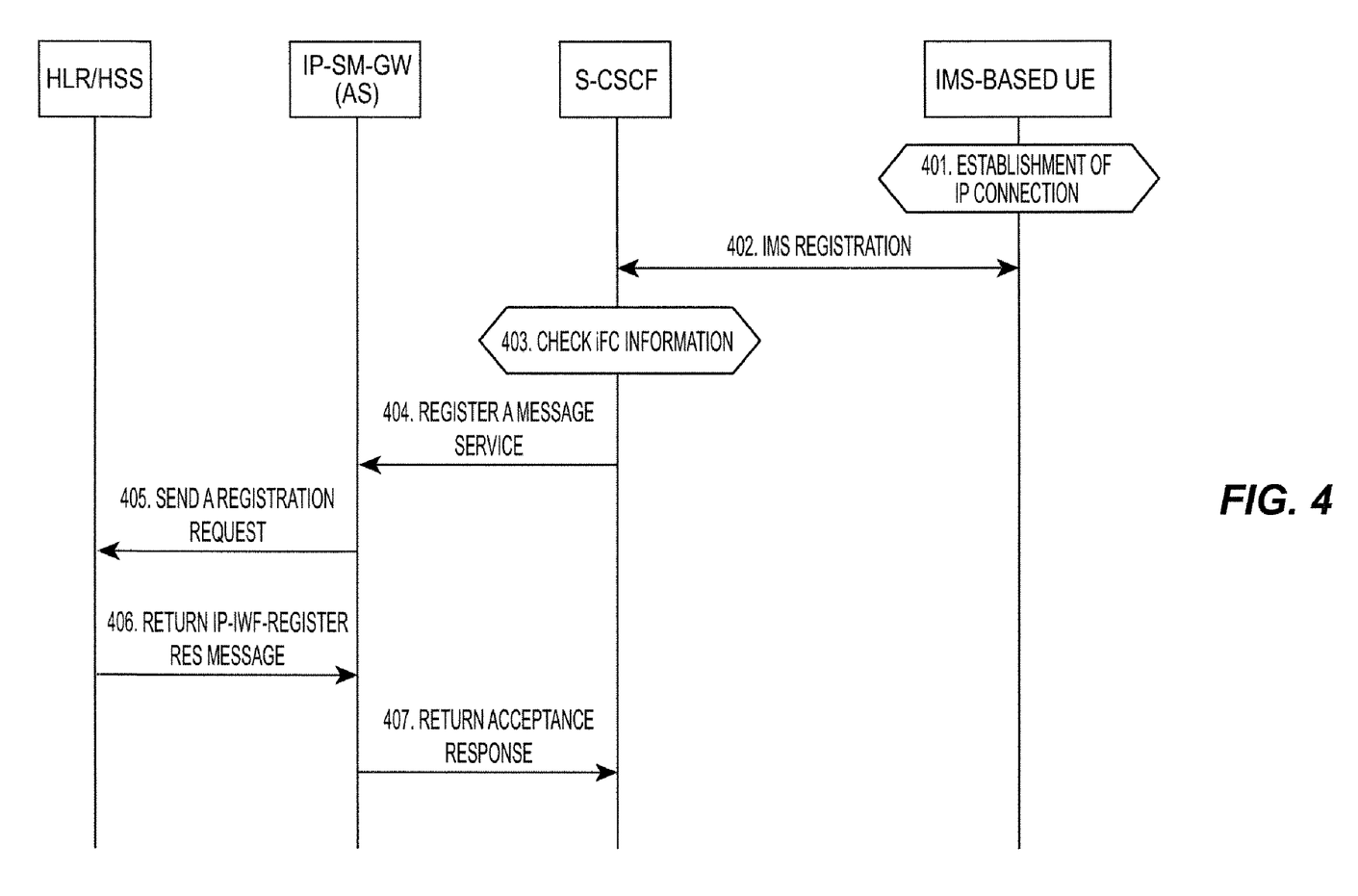
FIG. 4 is a flowchart of registering in an IP-SM-GW by an IP subscriber.

In the case of establishing a secure connection between a UE and an IP-SM-GW based on the network architecture of IMS, a process of an IMS-based calling subscriber UE registers in an IP-SM-GW is as shown in FIG. 4; the process includes the following steps.

Step 401. The calling subscriber UE establishes an IP connection (Establishment of IP connection).

Step 402. Upon establishing the IP connection successfully, the calling subscriber UE registers in an S-CSCF according to the IMS registering process (IMS Registration). Functional entities of I-CSCF and P-CSCF and information transmitted between the S-CSCF and an HSS will be involved in the IMS registering process, which will not be further described for brevity Step 403. The S-CSCF checks initial filter criteria (iFC) information obtained from the HLR/HSS in the IMS registering process (Check iFC information).

Step 404. After an IMS registration is successful, the S-CSCF notifies, according to the iFC information, an IP-SM-GW that the UE has registered in the IMS domain (SIP REGISTER).

Step 405. The IP-SM-GW sends a registration request (IP-IWF-Register Req) to the HLR/HSS to register its own address information and an identifier of UE in the HLR/HSS.

Step 406. The HLR/HSS stores the address information of IP-SM-GW and the identifier of UE, and then returns an IP-IWF-Register Res to the IP-SM-GW.

Step 407. The IP-SM-GW returns an acceptance response (SIP 200 OK) message to the S-CSCF.

Figure 5:
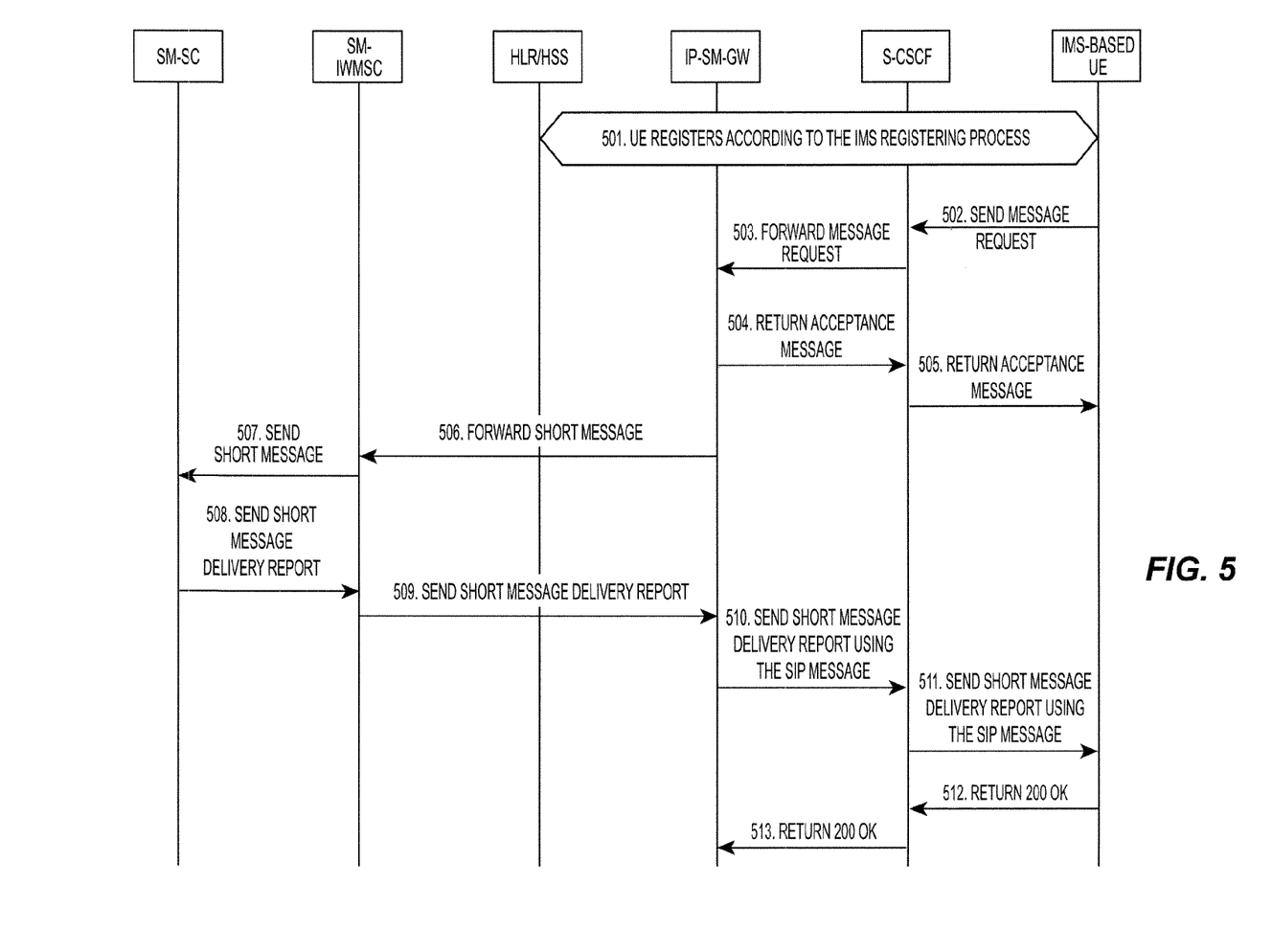
FIG. 5 is a flowchart of implementing a message service between an IMS-based calling subscriber and a traditional called subscriber.

After a piece of UE has registered in an IP-SM-GW by the registering process illustrated in FIG. 4, a processing procedure that the UE implements a message service between an IMS-based calling subscriber and a traditional called subscriber is shown in FIG. 5; the processing procedure includes the following steps.

Step 501. A piece of UE registers in an S-CSCF according to the IMS registering process (SIP/IMS Registration/re-registration procedure).

Step 502. The UE sends a MESSAGE request to the S-CSCF based on a Session Initial Protocol (SIP) MESSAGE manner.

Step 503. The S-CSCF forwards the MESSAGE request to an IP-SM-GW according to iFC information.

Step 504. The IP-SM-GW returns to the S-CSCF an SIP 202 acceptance message indicating that the MESSAGE request has been accepted (Accepted).

Step 505. The S-CSCF forwards the SIP 202 acceptance message to the UE.

Step 506. After parsing the MESSAGE request, the IP-SM-GW forwards a short message parsed from the MESSAGE request to an SM-IWMSC using a standard Mobile Application Part (MAP) signaling (Forward message). The address information of SM-SC may be parsed from the Requested-Uniform Resource Identifier (R-URI) or the message body of the MESSAGE request.

Step 507. The SM-IWMSC forwards the short message to an SM-SC (Message transfer).

Step 508. The SM-SC sends a short message delivery report to the SM-IWMSC (Delivery report).

Step 509. The SM-IWMSC sends the short message delivery report to the IP-SM-GW.

Step 510. The IP-SM-GW sends the short message delivery report to the S-CSCF using the SIP MESSAGE.

Step 511. The S-CSCF sends the short message delivery report to the UE using the SIP MESSAGE.

Step 512. The UE responds to the short message delivery report by a 200 ok message.

Step 513. The 200 ok message is forwarded to the IP-SM-GW via the S-CSCF.

It can be seen from the above description that, when a calling subscriber having registered in an IMS network domain initiates an IMS-based immediate message service, the called subscriber may be a subscriber having registered in an IMS network domain or a subscriber having only registered in a traditional Circuit Switch/Packet Switch (CS/PS) network domain or network domain of other types. The called subscribers having registered in different network domains have different processes on the selection of called network domain and on the routing of subsequent message. However, related art only describes the processes in the case of the called side network being an IMS network domain and there is no description about the processes to send a message from an IMS-based calling side net domain to a called subscriber via such network domains when the called side network is a traditional CS/PS network domain or network domain of other types, which makes the interworking processes between an IMS-based message and a non-IMS-based message unclear, thereby the practicability of message interworking between an IMS-based message and a non-IMS-based message is low.

SUMMARY OF THE INVENTION

Embodiments of the invention provide methods for implementing a message service based on IMS so as to improve the practicability of short message interworking between an IMS-based message and a non-IMS-based message, and provide systems for implementing a message service based on IMS, IMS-based S-CSCF, and IP-SM-GW are disclosed in the invention.

A method for implementing a message service based on IMS includes the following processes:

determining a network domain of a called subscriber according to information in a message service of a calling subscriber;

conducting the message service according to a type of the network domain of the called subscriber.

Moreover, two detailed method for implementing a message service based on IMS are provided, which are respectively described hereinafter.

A method for implementing a message service based on IMS includes the following processes:

an IMS-based S-CSCF receives a MESSAGE request;

after determining that a network domain of a called subscriber is a CS/PS-based network domain according to a called subscriber identifier in the MESSAGE request, the S-CSCF forwards the MESSAGE request to an IP-SM-GW corresponding to a calling subscriber, and the IP-SM-GW implements the message service.

A method for implementing a message service based on IMS includes the following processes:

an IMS-based S-CSCF receives a MESSAGE request;

the S-CSCF forwards the MESSAGE request to an IP-SM-GW corresponding to a calling subscriber;

the IP-SM-GW extracts contents of the MESSAGE request or converts the MESSAGE request to an SMS message when determine that the network domain of the called subscriber is a CS/PS-based network domain according to a called subscriber identifier in the MESSAGE request, and proceeds to implement the message service.

A system for implementing a message service based on IMS includes: an IMS-based S-CSCF, receiving a MESSAGE request, determining a network domain according to a called subscriber identifier in the MESSAGE request, and forwarding the MESSAGE request when the network domain of a called subscriber is a CS/PS-based network domain; an IP-Short Message-Gateway IP-SM-GW corresponding to a calling subscriber, receiving the MESSAGE request from the IMS-based S-CSCF and implementing the message service.

A system for implementing a message service based on IMS includes: an IMS-based S-CSCF, receiving a MESSAGE request, and forwarding the MESSAGE request; an IP-SM-GW corresponding to a calling subscriber, receiving the MESSAGE request from the IMS-based S-CSCF, determining a network domain according to a called subscriber identifier in the MESSAGE request, and extracting contents of the MESSAGE request or converting the MESSAGE request to an SMS message when the network domain of a called subscriber is a CS/PS-based network domain, and implementing the message service.

An IMS-based S-CSCF includes: a unit configured to receive a MESSAGE request; a unit configured to determine the network domain according to a called subscriber identifier in the MESSAGE request; a unit configured to forward the MESSAGE request when the network domain of the called subscriber is a CS/PS-based network domain, to implement a message service.

An IP-SM-GW includes: a unit configured to receive a MESSAGE request; a unit configured to determine the network domain according to a called subscriber identifier in the MESSAGE request; a unit configured to extract contents of the MESSAGE request or convert the MESSAGE request to an SMS message when the network domain of the called subscriber is a CS/PS-based network domain, and implement a message service.

DETAILED DESCRIPTION OF THE PREFERRED EMBODIMENTS

Embodiments of the invention disclose methods for implementing a message service based on IMS. According to the embodiments of this invention the IMS-based network domain of a calling side, such as the S-CSCF or IP-SM-GW corresponding to a calling subscriber, determines the network domain of a called subscriber according to the pre-configured information in the message service of the calling subscriber, and implements the message service according to the network domain of called subscriber.

It can be see from the above description of technical solution that, first, an IMS-based network domain of calling side, such as S-CSCF or IP-SM-GW corresponding to the calling subscriber, determines the network domain of called subscriber; then a message service may be executed in accordance with the network domain of called subscriber, which may facilitate the network domain of calling side to select different processing procedures to implement a message service of the called subscribers in different network domains, thereby bettering the interworking method between IMS-based messages and traditional short messages, improving the practicability of interworking between an message of IMS-based network domain and a short message of non-IMS-based network domain.

The technical solution in accordance with the embodiment of the invention is further described hereinafter.

Since the called subscriber may be a subscriber within the IMS network domain or a subscriber within a CS/PS network domain, the network side of UE#1 needs to determine the network domain of called subscriber UE#2 when a calling subscriber UE#1 within the IMS network domain initiates an IMS-based immediate message service.

It is possible to determine the network domain of the called subscriber via a called subscriber identifier in the immediate message service of UE#1, for example, UE#1 edits a message containing multimedia contents and needs to send the message to UE#2; UE#1 sends to a P-CSCF#1 a MESSAGE request of which the message body contains the message contents edited by UE#1; P-CSCF#1 forwards the MESSAGE request to an S-CSCF#1 in which UE#1 currently registers; S-CSCF#1 receives and determines the format of the called subscriber identifier in the MESSAGE request.

When S-CSCF#1 determines that the called subscriber identifier in the MESSAGE request is a called subscriber identifier in the SIP URI format, it is indicated that the called subscriber may be a subscriber within the IMS network domain; S-CSCF#1 may proceed to processes in accordance with the implementing process of immediate short message service within the IMS network domain, i.e., S-CSCF#1 transmits the MESSAGE request to the I-CSCF#2 corresponding to the called subscriber side; I-CSCF#2 proceeds to implement the message service in accordance with the processes shown in FIG. 1 in the prior art when I-CSCF#2 inquires about routing information from the HSS of the called subscriber and the HSS finds that the called subscriber has registered in the IMS network domain. I-CSCF#2 proceeds to implement the message service in accordance with the processes shown in FIG. 2 in the prior art when I-CSCF#2 inquires about routing information from the HSS of called subscriber and the HSS finds that the called subscriber has not registered in the IMS network domain but has subscribed to a "service of unregistered state".

When determining that the called subscriber identifier in the MESSAGE request is a called subscriber identifier in the TEL URI format, S-CSCF#1 proceeds to determine whether the format of called subscriber identifier in the MESSAGE request can be converted into the SIP URI format. S-CSCF#1 may determine whether the format of called subscriber identifier in the MESSAGE request can be converted into the SIP URI format via an information interaction between S-CSCF#1 and an E.164 Number (ENUM) server, for example, S-CSCF#1 requests the ENUM server to convert the called subscriber identifier in the TEL URI format to a called subscriber identifier in the SIP URI format.

When the ENUM server converts the called subscriber identifier in the TEL URI format to a called subscriber identifier in the SIP URI format successfully, S-CSCF#1 may proceed to process in accordance with the implementing process of immediate short message service within the IMS network domain, i.e., S-CSCF#1 transmits the MESSAGE request to I-CSCF#2 corresponding to the called subscriber side; I-CSCF#2 proceeds to implement the message service in accordance with the process shown in FIG. 1 in the prior art when I-CSCF#2 inquires about routing information from the HSS of called subscriber and the HSS finds that the called subscriber has registered in the IMS network domain. I-CSCF#2 proceeds to implement the message service in accordance with the processes shown in FIG. 2 in the prior art when I-CSCF#2 inquires about routing information from the HSS of called subscriber and the HSS finds that the called subscriber has not registered in the IMS network domain but has subscribed to a "service of unregistered state".

When determining that the called subscriber identifier in the TEL URI format can not be converted into the called subscriber identifier in the SIP URI format according to a result of information interaction with the ENUM server, S-CSCF#1 routes the MESSAGE request to an Application Server (AS), such as IP-SM-GW, for the subsequent message processing according to a service logic matching the MESSAGE request.

Figure 7:
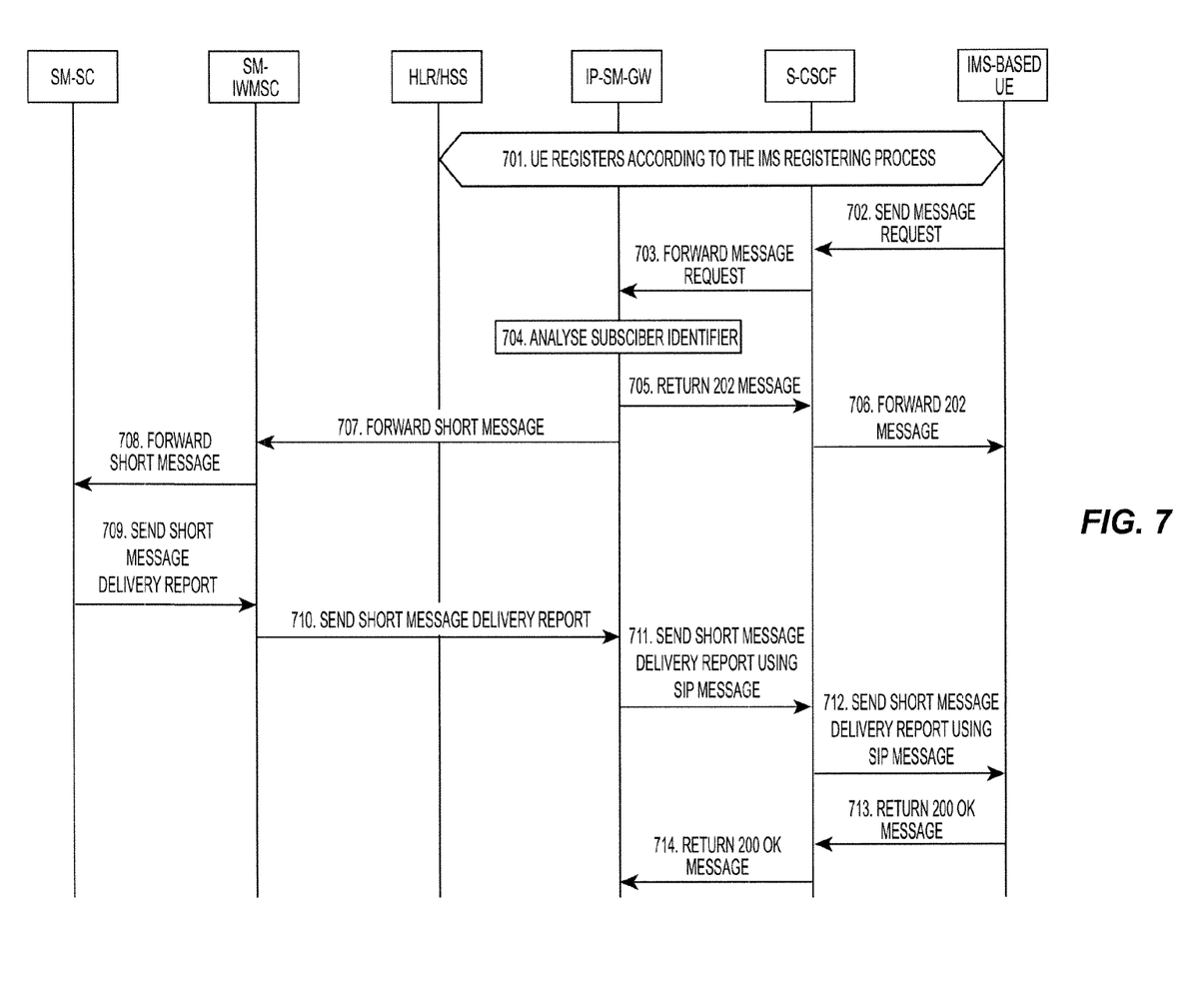
FIG. 7 is the flowchart of a method for implementing an IMS-based message service in accordance with a second embodiment of the invention.

The forgoing is described supposing that S-CSCF#1 corresponding to the calling subscriber determines the network domain of called subscriber UE#2. It may be possible to determine the network domain of called subscriber by an IP-SM-GW corresponding to the calling subscriber in accordance with the embodiment of the invention. The process of determining the network domain of called subscriber by an IP-SM-GW is the same as the process of determining by S-CSCF#1, which is as shown in FIG. 7.

The process of performing the subsequent message processing by the IP-SM-GW includes: after parsing the contents of MESSAGE request and assembling the contents into a standard MAP signaling, the IP-SM-GW sends to an SM-IWMSC/SM-SC the MAP signaling. In the MAP signaling the source address is the MSISDN of UE#1 and the destination address is the address information of SM-IWMSC/SM-SC.

In addition, the IP-SM-GW may convert the identifier information in the TEL URI format of the called subscriber UE#2 to the identifier information in the E.164 format, and fills the identifier information in an E.164 format in the message body of MAP signaling as a portion of short message contents.

If the IP-SM-GW can not assemble the contents of MESSAGE request into a standard MAP signaling, for example, when an information unit that an MAP signaling can not support is in the MESSAGE request, the method in accordance with the embodiment of this invention is over.

The address information of SM-IWMSC/SM-SC may be parsed by the IP-SM-GW from the MESSAGE request sent by UE#1, or may be obtained by the IP-SM-GW from the subscriber data of UE#1 downloaded from the HSS when the IP-SM-GW registers its address information and the identifier information of UE#1 in the HSS, or may be obtained from the processes of information interaction between the IP-SM-GW and other data storing entities that store the information associated with UE#.

The MSISDN of UE#1 may be obtained through conversion by IP-SM-GW from the identifier information of UE#1 in the SIP URI format. The IP-SM-GW may download the corresponding relation between the identifier information of UE#1 in the SIP URI format and the identifier information of UE#1 in the MSISDN format from the HSS when the IP-SM-GW registers its own address information and the identifier information of UE#1 in the HSS, and convert the identifier information of UE#1 of the MESSAGE request in SIP URI format into the identifier information in MSISDN format according to the corresponding relation, and use the identifier information of UE#1 in the MSISDN format as the source address information of MAP signaling.

Figure 8:
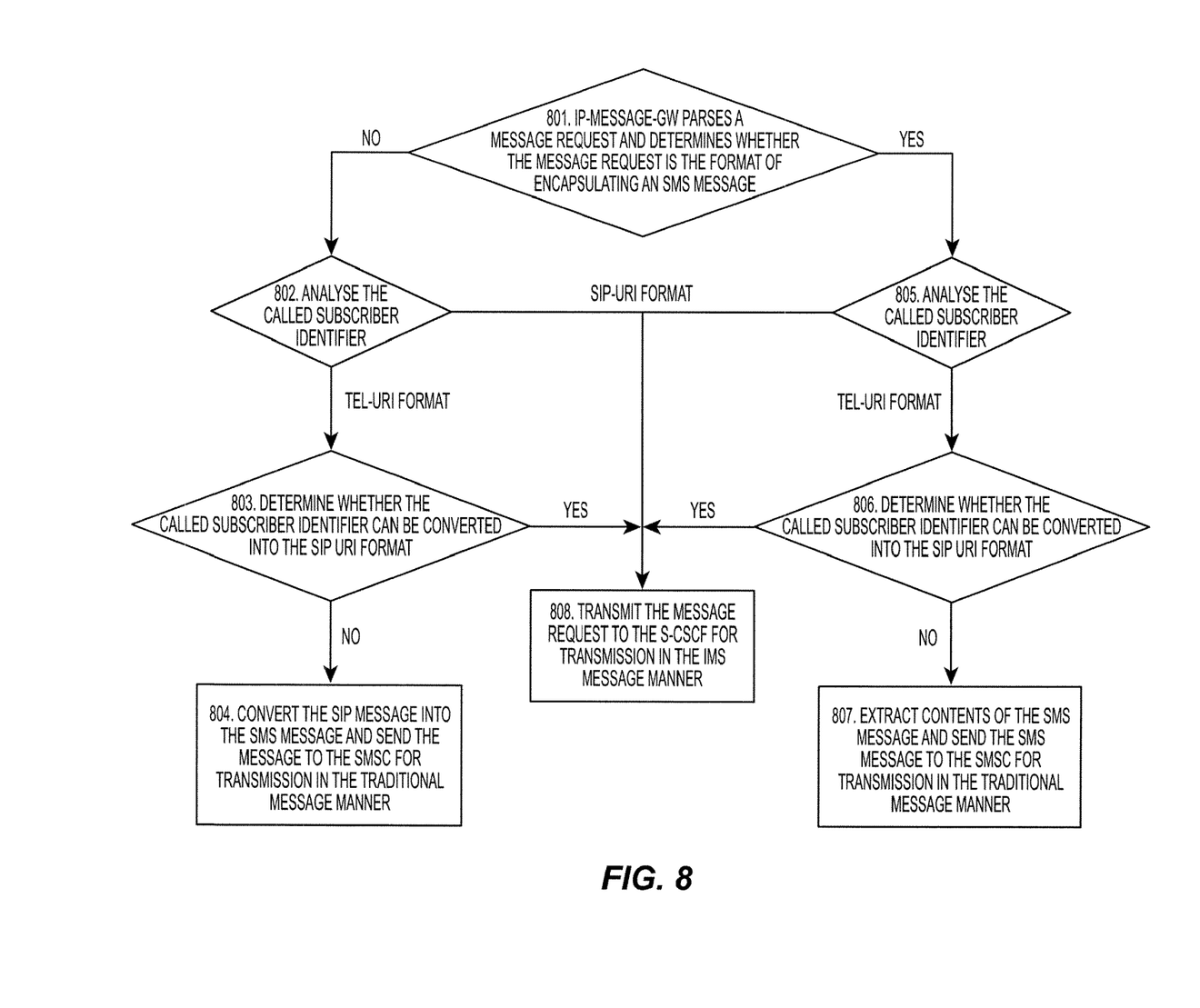
FIG. 8 is the flowchart of a method for implementing an IMS-based message service in accordance with a third embodiment of the invention.

In addition, in the processes of parsing the contents of MESSAGE request before determining the format of the called subscriber identifier in the MESSAGE request, the IP-SM-GW may first determine whether the message is in the format of encapsulating an SMS message in an SIP message, and the IP-SM-GW may make the subsequent operation according to the SMS message encapsulated in the SIP message. The detailed process is as shown in FIG. 8.

There are many implementing ways for the method provided by the embodiment of the invention for implementing a message service based on IMS. The description is hereinafter given in detail with reference to embodiments of the S-CSCF#1 corresponding to an IMS-based calling subscriber UE#1 determining the network domain of called subscriber UE#2 and the IP-SM-GW in which an IMS-based calling subscriber UE#1 registers determining the network domain of called subscriber UE#2, respectively.

Figure 6:
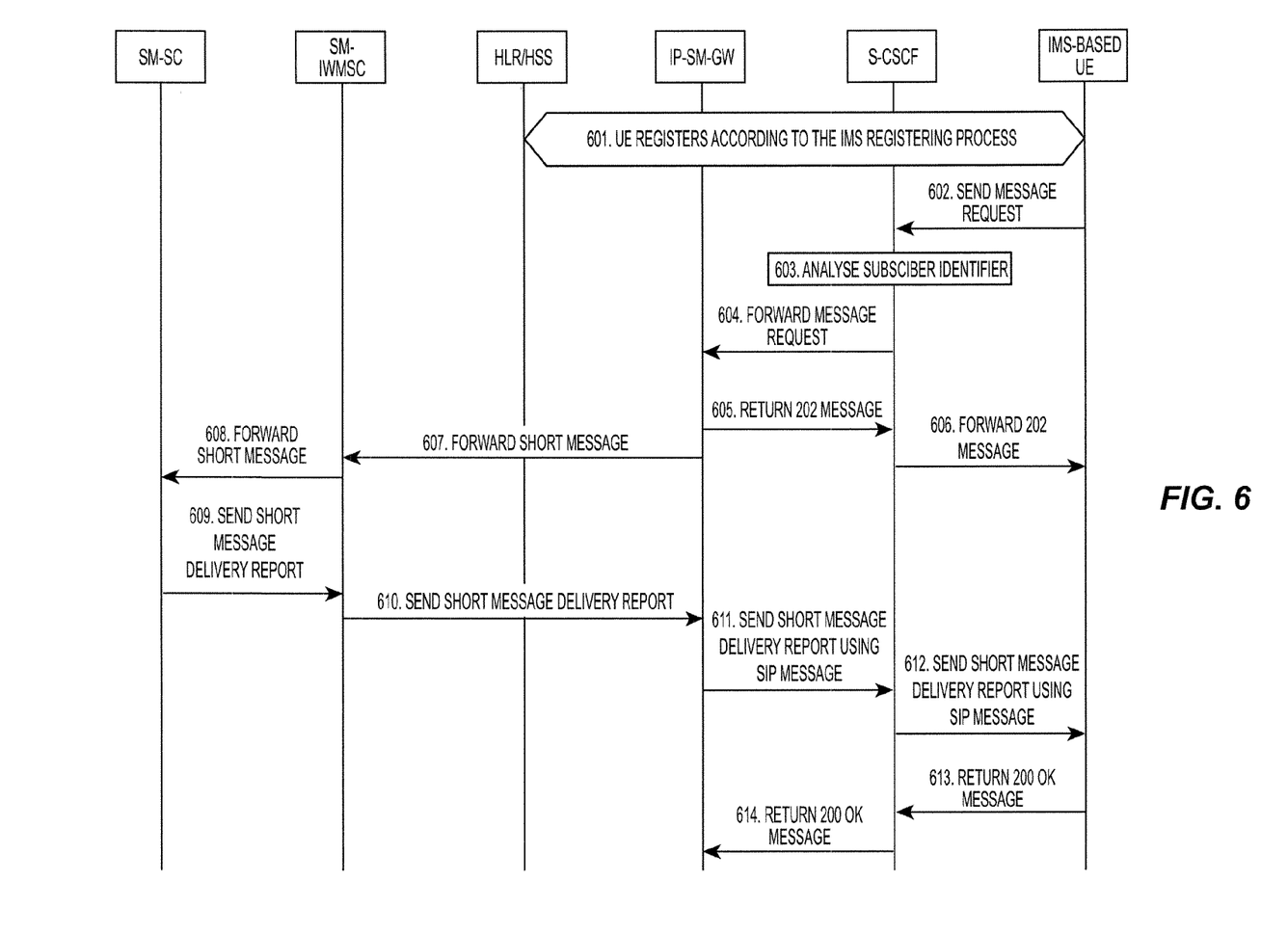
FIG. 6 is the flowchart of a method for implementing an IMS-based message service in accordance with a first embodiment of the invention.

FIG. 6 is the flowchart of the first embodiment of method for implementing a message service based on IMS. The process in which the S-CSCF#1 corresponding to an IMS-based calling subscriber UE#1 determines the network domain of called subscriber UE#2 specifically includes the following steps.

Step 601. An IMS-based calling subscriber UE registers in an S-CSCF according to the IMS registering process (SIP/IMS registration/re-registration procedure). Function entities of I-CSCF and P-CSCF and much information transmitted between the S-CSCF and the HSS will be involved in the IMS registering process, for brevity, the I-CSCF and P-CSCF and the much information transmitted between the S-CSCF and the HSS will not be further described.

Step 602. The calling subscriber UE sends a MESSAGE request in an SIP MESSAGE manner to the S-CSCF with the US registered.

Step 603. The S-CSCF analyses and determines the format of the called subscriber identifier in the MESSAGE request received (Identity Analyze); proceed to Step 604 when the S-CSCF determines that the called subscriber identifier in the TEL URI format can not be converted into the called subscriber identifier in the SIP URI format.

There are two possible called subscriber identifiers in the MESSAGE request, namely a called subscriber identifier in the SIP URI format and a called subscriber identifier in the TEL URI format; different called subscriber identifiers lead to different processes in this step.

When the S-CSCF determines that the called subscriber identifier in the MESSAGE request is the called subscriber identifier in the SIP URI format, it is indicated that the called subscriber may be a subscriber within the IMS network domain; the S-CSCF may proceed to processes in accordance with the implementing processes of immediate short message service within the IMS network domain, i.e., the S-CSCF transmits the MESSAGE request to the I-CSCF#2 corresponding to the called subscriber UE#2; I-CSCF#2 proceeds to implement the message service in accordance with the processes shown in FIG. 1 in the prior art when I-CSCF#2 inquires about routing information from the HSS of called subscriber and the HSS finds that the called subscriber has registered in the IMS network domain. I-CSCF#2 proceeds to implement the message service in accordance with the processes shown in FIG. 2 in the prior art when I-CSCF#2 inquires about routing information from the HSS of called subscriber and the HSS finds that the called subscriber has not registered in the IMS network domain but has subscribed to a "service of unregistered state".

When the S-CSCF determines that the called subscriber identifier in the MESSAGE request is the called subscriber identifier in the TEL URI format, the S-CSCF accesses an ENUM server and exchanges information with the ENUM server; when the S-CSCF determines that the called subscriber identifier in the TEL URI format can be converted into a called subscriber identifier in the SIP URI format according to a result of the information interaction with the ENUM server, it is indicated that the called subscriber may be a subscriber within the IMS network domain; the S-CSCF may proceed to processes in accordance with the implementing process of immediate short message service within the IMS network domain, i.e., the S-CSCF transmits the MESSAGE request to the I-CSCF#2 corresponding to called subscriber UE#2; I-CSCF#2 proceeds to implement the message service in accordance with the processes shown in FIG. 1 in the prior art when I-CSCF#2 inquires about routing information from the HSS of called subscriber and the HSS finds that the called subscriber has registered in the IMS network domain. I-CSCF#2 proceeds to implement the message service in accordance with the processes shown in FIG. 2 in the prior art when I-CSCF#2 inquires about routing information from the HSS of called subscriber and the HSS finds that the called subscriber has not registered in the IMS network domain but has subscribed to a "service of unregistered state".

When the S-CSCF determines that the called subscriber identifier in the TEL URI format can not be converted into a called subscriber identifier in the SIP URI format according to the result of information interaction with the ENUM server, proceed to Step 604.

Step 604. The S-CSCF forwards the MESSAGE request to an AS, such as IP-SM-GW, according to a service logic matching the MESSAGE request.

In this embodiment, a service logic is pre-configured in the S-CSCF. The service logic is used for routing a MESSAGE request to an IP-SM-GW when the S-CSCF determines that the called subscriber identifier in the TEL URI format can not be converted into a called subscriber identifier in the SIP URI format It this step, the S-CSCF routes the MESSAGE request to the IP-SM-GW according to the service logic.

Step 605. After parsing contents of the MESSAGE request and assembling the contents into a standard MAP signaling, the IP-SM-GW sends the MAP signaling to the SM-IWMSC/SM-SC, wherein the source address of MAP signaling should be the MSISDN of UE#1 and the destination address of MAP signaling should be the address information of SM-IWMSC/SM-SC of calling subscriber UE#1.

The MSISDN of UE#1 may be obtained via a conversion by IP-SM-GW according to the identifier information of calling subscriber in SIP URI format in the MESSAGE request. To be specific, the IP-SM-GW may download the corresponding relation between the identifier information in SIP URI format and the identifier information of UE#1 in MSISDN format from the HSS when the IP-SM-GW is registering its own address information and the identifier information of UE#1 in the HSS, and the IP-SM-GW may convert the identifier information in SIP URI format of UE#1 of MESSAGE request to the identifier information in MSISDN format via the corresponding relation.

The address information of SM-SC may be parsed from the Requested-Uniform Resource Identifier (R-URI) portion or the message body portion of MESSAGE request, or the address information of SM-SC may be obtained by the IP-SM-GW from the subscriber data of UE#1 downloaded from the HSS when the IP-SM-GW is registering its own address information and the identifier information of UE#1 in the HSS, or the address information of SM-SC may be obtained from a process of information interaction between the IP-SM-GW and other data storing entities that store the information associated with UE#1.

The IP-SM-GW may download the relation between the identifier information in SIP URI format and the identifier information of UE#1 in MSISDN format from the HSS when the IP-SM-GW is registering its own address information and the identifier information of UE#1 in the HSS, and convert the identifier information in SIP URI format of UE#1 of MESSAGE request to the identifier information in MSISDN format via the relation, and use the converted MSISDN of UE#1 as the source address information of MAP signaling.

In addition, the IP-SM-GW may assemble the identifier information of called subscriber in TEL URI format into the identifier information in E.164 format via an information interaction with an ENUM server or by other methods, and fill the identifier information in E.164 format as a portion of short message contents in the message body of MAP signaling.

In this step, if the IP-SM-GW can assemble the MESSAGE request received by itself into a standard MAP signaling, the IP-SM-GW returns an SIP 202 message to the S-CSCF to indicate that it has accepted the MESSAGE request sent by the S-CSCF; and proceed to Step 606.

Otherwise, the IP-SM-GW returns to the S-CSCF a failure response message bearing a corresponding failure reason value to indicate that the information conversion has failed; the S-CSCF may further forward to the UE the failure response message bearing the corresponding failure reason value, and the current process ends. For example, if an information unit that an MAP signaling can not support is in the MESSAGE request, the IP-SM-GW can not assemble the MESSAGE request received by itself into a standard MAP signaling, and the process is over.

Step 606. The S-CSCF forwards the SIP 202 acceptance message received by itself to the calling subscriber.

Step 607. After parsing the MESSAGE request, the IP-SM-GW forwards a short message parsed from the MESSAGE request to an SM-IWMSC using a standard MAP signaling (Forward message).

Step 608. The SM-IWMSC forwards the short message to the SM-SC (Message transfer).

Step 609. The SM-SC sends a short message delivery report to the SM-IWMSC (Delivery report).

Step 610. The SM-IWMSC sends a short message delivery report to the IP-SM-GW.

Step 611. The IP-SM-GW sends a short message delivery report to the S-CSCF using an SIP MESSAGE.

Step 612. The S-CSCF sends a short message delivery report to the calling subscriber using an SIP MESSAGE.

Step 613. The calling subscriber responses to the received short message delivery report using a 200 ok message.

Step 614. The 200 ok message is forwarded to the IP-SM-GW via the S-CSCF.

FIG. 7 is the flowchart of the second embodiment of method for implementing a message service based on IMS, and has the processes in which an IP-SM-GW corresponding to an IMS-based calling subscriber UE#1 determines the network domain of called subscriber UE#2. The processes include the following steps.

Step 701. An IMS-based calling subscriber UE registers in an S-CSCF according to an IMS registering process. Function entities of I-CSCF and P-CSCF and much information transmitted between the S-CSCF and the HSS will be involved in the registering flow of IMS, for brevity, the I-CSCF and P-CSCF and the much information transmitted between the S-CSCF and the HSS will not be further described.

The calling subscriber UE in this embodiment is a UE that has registered in the IP-SM-GW, and the registering process is the same as that illustrated in FIG. 4 of prior art, the registering process will not be described for brevity.

Step 702. The calling subscriber UE sends a MESSAGE request in an SIP MESSAGE manner to the S-CSCF with the calling subscriber UE registered.

Step 703. The S-CSCF forwards the MESSAGE request to an AS, such as IP-SM-GW, according to a service logic matching the MESSAGE request.

In this embodiment, a service logic is pre-configured in the S-CSCF. The service logic is used for routing the MESSAGE request to the IP-SM-GW when the S-CSCF receives a MESSAGE request. In this step, the S-CSCF routes the MESSAGE request to the IP-SM-GW according to the service logic.

Step 704. The IP-SM-GW analyses and determines the format of the called subscriber identifier in the MESSAGE request received by itself; proceed to Step 705 when the IP-SM-GW determines that the called subscriber identifier in the TEL URI format can not be converted into the called subscriber identifier in the SIP URI format.

There are two possible called subscriber identifiers in the MESSAGE request, namely a called subscriber identifier in the SIP URI format, and a called subscriber identifier in the TEL URI format; different called subscriber identifiers lead to different processes in this step.

When an IP-SM-GW determines that the called subscriber identifier in the MESSAGE request is the called subscriber identifier in the SIP URI format, it is indicated that the called subscriber may be a subscriber with the IMS network domain; the IP-SM-GW should transmit the MESSAGE request to the S-CSCF with the calling subscriber registered, such that the S-CSCF may proceed to processes in accordance with the implementing processes of immediate short message service within the IMS network domain, i.e., the S-CSCF transmits the MESSAGE request to the I-CSCF#2 corresponding to the called subscriber UE#2; I-CSCF#2 proceeds to implement the message service in accordance with the processes shown in FIG. 1 in the prior art when I-CSCF#2 inquires about routing information from the HSS of called subscriber and the HSS finds that the called subscriber has registered in the IMS network domain. I-CSCF#2 proceeds to implement the message service in accordance with the processes shown in FIG. 2 in the prior art when I-CSCF#2 inquires about routing information from the HSS of called subscriber and the HSS finds that the called subscriber has not registered in the IMS network domain but has subscribed to a "service of unregistered state".

When the IP-SM-GW determines that the called subscriber identifier in the MESSAGE request is the called subscriber identifier in the TEL URI format, the IP-SM-GW accesses an ENUM server and exchanges information with the ENUM server; when the IP-SM-GW determines that the called subscriber identifier in the TEL URI format can be converted into a called subscriber identifier in the SIP URI format according to a result of the information interaction with the ENUM server, it is indicated that the called subscriber may be a subscriber within the IMS network domain; the IP-SM-GW should transmit the MESSAGE request to the S-CSCF with the calling subscriber registered; the S-CSCF may proceed to processes in accordance with the implementing process of immediate short message service within the IMS network domain, i.e., the S-CSCF transmits the MESSAGE request to the I-CSCF#2 corresponding to the called subscriber UE#2; I-CSCF#2 proceeds to implement the message service in accordance with the processes shown in FIG. 1 in the prior art when I-CSCF#2 inquires about routing information firm the HSS of called subscriber and the HSS finds that the called subscriber has registered in the IMS network domain. I-CSCF#2 proceeds to implement the message service in accordance with the processes shown in FIG. 2 in the prior art when I-CSCF#2 inquires about routing information from the HSS of called subscriber and the HSS finds that the called subscriber has not registered in the IMS network domain but has subscribed to a "service of unregistered state".

When the IP-SM-GW determines that the called subscriber identifier in the TEL URI format can not be converted into a called Subscriber identifier in the SIP URI format according to the result of information interaction with the ENUM server, proceed to Step 705.

Step 705. After parsing contents of MESSAGE request and assembling the contents into a standard MAP signaling the IP-SM-GW sends the MAP signaling to the SM-IWMSC/SM-SC, wherein the source address of MAP signaling is the MSISDN of calling subscriber and the destination address of MAP signaling is the address information of SM-IWMSC/SM-SC of calling subscriber.

The method for obtaining address information of MSISDN and SM-IWMSC/SM-SC of calling subscriber is the same as that in Step 605 illustrated in FIG. 6, the method will not be further described here.

In this step, if the IP-SM-GW can assemble the MESSAGE request received by itself into a standard MAP signaling, the IP-SM-GW responds an SIP 202 message to the S-CSCF to indicate that it has accepted the MESSAGE request sent by the S-CSCF; and proceed to Step 706.

Otherwise, the IP-SM-GW responds to the S-CSCF a failure response message bearing the appropriate failure reason value to indicate that the information conversion has failed; the S-CSCF may further forward to the UE the failure response message bearing the appropriate failure reason value. The method in accordance with the embodiment of this invention is over.

Step 706. The S-CSCF forwards the SIP 202 acceptance message received to the calling subscriber.

Step 707. After parsing the MESSAGE request, the IP-SM-GW forwards a short message parsed from the MESSAGE request to an SM-IWMSC using a standard MAP signaling.

Step 708. The SM-IWMSC forwards the short message to the SM-SC.

Step 709. The SM-SC sends a short message delivery report to the SM-IWMSC.

Step 710. The SM-IWMSC sends a short message delivery report to the IP-SM-GW.

Step 711. The IP-SM-GW sends a short message delivery report to the S-CSCF using an IP MESSAGE.

Step 712. The S-CSCF sends a short message delivery report to the calling subscriber using an SIP MESSAGE.

Step 713. The calling subscriber responds to the received short message delivery report using a 200 ok message.

Step 714. The 200 ok message is forwarded to the IP-SM-GW via the S-CSCF.

FIG. 8 is the flowchart of the third embodiment of method for implementing a message service based on IMS. In this embodiment, an IP-SM-GW with an IMS-based calling subscriber registered determines the network domain of called subscriber, and an SIP-based calling subscriber UE registers in the S-CSCF according to the IMS registering process. Function entities of I-CSCF and P-CSCF and much information transmitted between the S-CSCF and the HSS will be involved in the IMS registering process, the function entities of I-CSCF and P-CSCF and much information will not be described further for brevity.

After receiving the message sent by the calling subscriber, the S-CSCF forwards the message to the IP-SM-GW according to the iFC configuration of network; after receiving the message by the IP-SM-GW, the processes include the following steps.

Step 801. the IP-SM-GW parses a MESSAGE request at first, and determine whether the MESSAGE request is in the format of encapsulating an SMS message in an SIP message, if so, proceed to Step 805, otherwise, proceed to Step 802.

Step 802. The IP-SM-GW analyses the called subscriber identifier in the MESSAGE request, if the called subscriber identifier is in the SIP URI format, proceeds to Step 808, if the identifier is in the TEL URI format, proceeds to Step 803.

Step 803. The IP-SM-GW determines whether the called subscriber identifier can be converted into the SIP URI format by its own analysis or inquiry from the ENUM server, if so, converts the called subscriber identifier into the SIP URI format and proceeds to Step 808, otherwise, proceeds to Step 804.

Step 804. The IP-SM-GW converts format of the calling/called subscriber identifier to the E.164 format by its own analysis or inquiry from the ENUM server, converts the SIP message into an SMS messages and sends the SMS message to the Short Message Service Center (SM-SC) for message transmission in the traditional short message manner.

Step 805. The IP-SM-GW analyses the called subscriber identifier in the message, if the identifier is in the SIP URI format, proceeds to Step 808, if the identifier is in the TEL URI format, proceeds to Step 806.

Step 806. The IP-SM-GW determines whether the called subscriber identifier can be converted into the SIP URI format by its own analysis or inquiry from the ENUM server, if so, converts the called subscriber identifier into the SIP URI format and proceeds to Step 808, otherwise, proceeds to Step 807.

Step 807. The IP-SM-GW extracts contents of the SMS message from the MESSAGE request, and sends the SMS message to the SM-IWMSC/SM-SC for message transmission in the traditional short message manner.

Step 808. The IP-SM-GW transmits the MESSAGE request with called subscriber identifier in the SIP URI format to the S-CSCF with the calling subscriber registered; and the S-CSCF proceeds to the processes according to the implementing process of immediate message service within the IMS domain.

Though this invention is described through the embodiments, those skilled in the art may make changes and variations to the method of this invention without departing from the spirit and scope thereof, therefore any change or variation within the technical scope disclosed by this invention should be covered by the protection scope of this invention.

What is claimed is:

1. A method for implementing a message service based on IP Multimedia Subsystem (IMS), the method comprising:
    determining a network domain of a called subscriber according to information in a message service of a calling subscriber;
    conducting the message service according to a type of the network domain of the called subscriber,
    wherein the information in the message service of the calling subscriber comprises a called subscriber identifier;
    wherein the process of determining the network domain comprises determining the network domain of the called subscriber by an IMS-based network domain of a calling side according to a format of the called subscriber identifier in a MESSAGE request of the message service of the calling subscriber;
    wherein the network domain of the called subscriber comprises an IMS-based network domain or a non-IMS-based network domain that comprises a Circuit Switch/Packet Switch (CS/PS)-based network domain;
    wherein the process of determining the network domain comprises:
        determining, by the IMS-based network domain of the calling side, that the network domain of the called subscriber is the IMS-based network domain, if the called subscriber identifier is in a Session Initial Protocol Uniform Resource Identifier (SIP URI) format;
        determining, by the IMS-based network domain of the calling side, that the network domain of the called subscriber is the non-IMS-based network domain, if the called subscriber identifier is in a non-SIP URI format and can not be converted into the SIP URI format;
    wherein the process of determining the network domain further comprises determining that the network domain of the called subscriber is the CS/PS-based network domain, if the called subscriber identifier is in a telephone (TEL) URI format and can not be converted into the SIP URI format;
    wherein in the process of determining the network domain, a Serving-Call Session Control Function (S-CSCF) or an IP-Short Message-Gateway (IP-SM-GW) corresponding to the calling subscriber determines the network domain of the called subscriber;
    wherein if the S-CSCF corresponding to the calling subscriber determines the network domain of the called subscriber, and when the called subscriber identifier is in the non-SIP URI format and can not be converted into the SIP URI format, the process of conducting the message service comprises:
        forwarding, by the S-CSCF corresponding to the calling subscriber, the MESSAGE request of the message service to the IP-SM-GW to proceed to conduct the message service outside the IMS-based network domain.

2. The method of claim 1, wherein if the S-CSCF corresponding to the calling subscriber determines the network domain of called subscriber, and when the called subscriber identifier is in the SIP URI format, or is in the non-SIP URI format but can be converted into the SIP URI format, the process of conducting the message service comprises:
    conducting the message service by the S-CSCF corresponding to the calling subscriber according to a registration state of the called subscriber in the IMS-based network domain.

3. The method of claim 1, wherein the S-CSCF corresponding to the calling subscriber routes the message service to the IP-SM-GW according to a service logic, if the S-CSCF determines that the called subscriber identifier in the TEL URI format can not be converted into the called subscriber identifier in the SIP URI format.

4. The method of claim 1, wherein if the IP-SM-GW corresponding to the calling subscriber determines the network domain of called subscriber, and when the called subscriber identifier is in the SIP URI format or the called subscriber identifier is in the non-SIP URI format but can be converted into the SIP URI format, the process of conducting the message service comprises:
    transmitting the MESSAGE request of the message service to the S-CSCF corresponding to the calling subscriber by the IP-SM-GW corresponding to the calling subscriber;
    conducting the message service according to a registration state of the called subscriber in the IMS-based network domain by the S-CSCF corresponding to the calling subscriber.

5. The method of claim 4, wherein the S-CSCF corresponding to the calling subscriber routes the MESSAGE request of the message service to the IP-SM-GW according to the service logic when the S-CSCF receives the MESSAGE request of tile message service; and
    after receiving the MESSAGE request of the message service sent from the S-C SCF corresponding to the calling subscriber, the IP-SM-GW corresponding to the calling subscriber makes format judgment to the called subscriber identifier.

6. The method of claim 1, wherein if the IP-SM-GW corresponding to the calling subscriber determines the network domain of the called subscriber, and when the called subscriber identifier is in the non-SIP URI format and can not be converted into the SIP URI format, the process of conducting the message service comprises:
conducting the message service outside the IMS-based network domain by the IP-SM-GW.

7. The method of claim 6, wherein the S-CSCF corresponding to the calling subscriber routes the MESSAGE request of the message service to the IP-SM-GW according to a service logic when the S-CSCF receives the MESSAGE request of the message service; and
after receiving the MESSAGE request of the message service sent from the S-CSCF corresponding to the calling subscriber, the IP-SM-GW corresponding to the calling subscriber makes format judgment to the called subscriber identifier.

8. The method of claim 6, wherein the conducting the message service outside the IMS-based network domain by the IP-SM-GW comprises:
parsing, by the IP-SM-GW, contents of the MESSAGE request of the message service received and assembling the contents into a message body of an MAP signaling;
obtaining, by the IP-SM-GW, address information of the calling subscriber and determining source address information of the MAP signaling according to the address information of calling subscriber;
obtaining, by the IP-SM-GW, address information of an SM-IWMSC/SM-SC of the calling subscriber, and determining destination address information of the MAP signaling according to the address information of the SM-IWMSC/SM-SC of the calling subscriber;
sending, by the IP-SM-GW, the MAP signaling.

9. The method of claim 8, further comprising:
converting by the IP-SM-GW the format of the called subscriber identifier into an E.164 format from the TEL URI format, and bearing the called subscriber identifier as a portion of the contents in the message body of the MAP signaling.

10. The method of claim 8, further comprising:
returning, by the IP-SM-GW, a response message containing a failure reason value to the S-CSCF corresponding to the calling subscriber when the contents of the MESSAGE request of the message service can not be assembled into the MAP signaling.

11. The method of claim 8, wherein the address information of the calling subscriber comprises an MSISDN;
and the process of obtaining the address information of the calling subscriber by the IP-SM-GW comprises:
downloading and storing by the IP-SM-GW a relation between the calling subscriber identifier in the SIP URI format and the MSISDN of the calling subscriber when the calling subscriber is registering;
determining by the IP-SM-GW the MSISDN of the calling subscriber according to the relation.

12. The method of claim 8, wherein the process of obtaining the address information of the SM-IWMSC/SM-SC of the calling subscriber by the IP-SM-GW comprises one of the following processes:
parsing, by the IP-SM-GW, the address information of the SM-IWMSC/SM-SC of the calling subscriber from the message service of the calling subscriber; and
obtaining, by the IP-SM-GW, the address information of the SM-IWMSC/SM-SC of the calling subscriber from information of the calling subscriber; and
obtaining, by the IP-SM-GW, the address information of the SM-IWMSC/SM-SC of the calling subscriber via information interaction with a data storing entity that stores the information of the calling subscriber.

13. The method of claim 1, wherein the S-CSCF or IP-SM-GW corresponding to the calling subscriber determines whether the format of called subscriber identifier can be converted into the SIP URI format according to an information interaction with an E.164 Number (ENUM) server.

14. The method of claim 1, wherein the conducting the message service outside the IMS-based network domain by the IP-SM-GW comprises:
parsing, by the IP-SM-GW, contents of the MESSAGE request of the message service received and assembling the contents into a message body of a Mobile Application Part (MAP) signaling;
obtaining, by the IP-SM-GW, address information of the calling subscriber and determining source address information of the MAP signaling according to the address information of the calling subscriber;
obtaining, by the IP-SM-GW, address information of a Short Message-InterWorking Mobile Switch Center/Short Message-Service Center (SM-IWMSC/SM-SC) of the calling subscriber, and determining destination address information of the MAP signaling according to the address information of the SM-IWMSC/SM-SC of the calling subscriber;
sending, by the IP-SM-GW, the MAP signaling.

15. The method of claim 14, further comprising:
converting by the IP-SM-GW the format of the called subscriber identifier into an E.164 format from the TEL URI format, and bearing the called subscriber identifier as a portion of the contents in the message body of the MAP signaling.

16. The method of claim 14, further comprising:
returning, by the IP-SM-GW, a response message containing a failure reason value to the S-CSCF corresponding to the calling subscriber when the contents of the MESSAGE request of the message service can not be assembled into the MAP signaling.

17. The method of claim 14, wherein the address information of the calling subscriber comprises a Mobile Subscriber ISDN Number (MSISDN);
and the process of obtaining the address information of the calling subscriber by the IP-SM-GW comprises:
downloading and storing by the IP-SM-GW a relation between the calling subscriber identifier in the SIP URI format and the MSISDN of the calling subscriber when the calling subscriber is registering;
determining by the IP-SM-GW the MSISDN of the calling subscriber according to the relation.

18. The method of claim 14, wherein the process of obtaining the address information of the SM-IWMSC/SM-SC of the calling subscriber by the IP-SM-GW comprises one of the following processes:
parsing, by the IP-SM-GW, the address information of the SM-IWMSC/SM-SC of the calling subscriber from the message service of the calling subscriber; and
obtaining, by the IP-SM-GW, the address information of the SM-IWMSC/SM-SC of the calling subscriber from information of the calling subscriber; and
obtaining, by the IP-SM-GW, the address information of the SM-IWMSC/SM-SC of the calling subscriber via information interaction with a data storing entity that stores the information of the calling subscriber.

19. The method of claim 1, further comprising: if the IP-SM-W corresponding to the calling subscriber determines the network domain of called subscriber, determining, by the IP-SM-GW, whether a MESSAGE request of the message service is in the format of encapsulating an SMS message in an SIP message before determining the format of called subscriber identifier in the MESSAGE request, and making subsequent operations according to whether or not the SMS message is encapsulated in the SIP message.

20. The method of claim 19, wherein the process of making subsequent operations according to whether or not the SMS message is encapsulated in the SIP message comprises:
  extracting the SMS message if the MESSAGE request is in the format of encapsulating the SMS message in the SIP message and the called subscriber identifier is the TEL URI format and can not be converted into the SIP URI format, sending the SMS message to the SM-SC for transmission;
  converting the MESSAGE request into the SMS message if the MESSAGE request is not in the format of encapsulating the SMS message in the SIP message and the called subscriber identifier is the TEL URI format and can not be converted into the SIP URI format, sending the SMS message to the SM-SC for transmission.

21. A method for implementing a message service based on IP Multimedia Subsystem (IMS), comprising:
  receiving a MESSAGE request by an IMS-based Serving-Call Session Control Function (S-CSCF);
  after determining that a network domain of a called subscriber is a Circuit Switch/Packet Switch (CS/PS)-based network domain according to a called subscriber identifier ill the MESSAGE request, forwarding by the S-CSCF the MESSAGE request to an IP-Short Message-Gateway (IP-SM-GW) corresponding to a calling subscriber, implementing the message service by the IP-SM-GW, wherein the process of implementing the message service by the IP-SM-GW comprises:
  parsing, by the IP-SM-GW, contents of the MESSAGE request of the message service and assembling the contents into the message body of Mobile Application Part (MAP) signaling;
  obtaining, by the IP-SM-GW, address information of the calling subscriber and determining source address information of the MAP signaling according to the address information of the calling subscriber;
  obtaining, by the IP-SM-GW, address information of Short Message-InterWorking Mobile Switch Center/Short Message-Service Center (SM-IWMSC/SM-SC) of the calling subscriber, and determining destination address information of MAP signaling according to the address information of the SM-IWMSC/SM-SC of the calling subscriber;
  sending, by the IP-SM-GW, the MAP signaling.

22. The method of claim 21, wherein in the process of forwarding the MESSAGE request, the S-CSCF determines a type of the network domain of the called subscriber according to the format of the called subscriber identifier in the MESSAGE request.

23. The method of claim 21, wherein the process of determining the type of the network domain of the called subscriber comprises:
  determining by the S-CSCF that the network domain of the called subscriber is an IMS-based network domain if the called subscriber identifier is in a Session Initial Protocol Uniform Resource Identifier (SIP URI) format or in a telephone (TEL) URI format which can be converted into the SIP URI format;
  determining by the S-CSCF that the network domain of the called subscriber is a CS/PS-based network domain if the called subscriber identifier is in a TEL URI format and can not be converted into the SIP URI format.

24. The method of claim 23, wherein the S-CSCF determines whether the format of called subscriber identifier can be converted into the SIP URI format according to an information interaction with an E.164 Number (ENUM) server.

25. A method for implementing a message service based on IP Multimedia Subsystem (IMS), the method comprising:
  receiving a MESSAGE request by an IMS-based Serving-Call Session Control Function (S-CSCF);
  forwarding, by the S-CSCF, the MESSAGE request to an IP-Short Message-Gateway (IP-SM-GW) corresponding to a calling subscriber;
  extracting, by the IP-SM-GW, contents of the MESSAGE request or converting the MESSAGE request to a short message service (SMS) message when determining that a network domain of a called subscriber is a Circuit Switch/Packet Switch (CS/PS)-based network domain according to a called subscriber identifier in the MESSAGE request, and proceeding to implement the message service;
  wherein the S-CSCF routes the MESSAGE request to the IP-SM-GW according to a service logic when the S-CSCF receives the MESSAGE request;
  wherein in a process of extracting or converting the MESSAGE request, the IP-SM-GW determines a type of the network domain of the called subscriber according to a format of the called subscriber identifier in the MESSAGE request;
  wherein the process of determining the type of the network domain of the called subscriber comprises:
  determining by the IP-SM-GW that the network domain of the called subscriber is an IMS-based network domain if the called subscriber identifier is in a Session Initial Protocol Uniform Resource Identifier (SIP URI) format or in a telephone (TEL) URI format which can be converted into the SIP URI format;
  determining by the IP-SM-GW that the network domain of the called subscriber is a CS/PS-based network domain if the called subscriber identifier is in the TEL URI format and can not be converted into the SIP URI format.

26. The method of claim 25, wherein the IP-SM-GW determines whether the format of the called subscriber identifier can be converted into the SIP URI format according to an information interaction with an E.164 Number (ENUM) server.

27. The method of claim 25, wherein the process of extracting or converting the MESSAGE request and implementing the message service comprises:
  determining, by the IP-SM-GW, whether the MESSAGE request is in a format of encapsulating an SMS message in an SIP message before determining the format of the called subscriber identifier in the MESSAGE request;
  extracting the SMS message if the MESSAGE request is in the format of encapsulating the SMS message in the SIP message and the called subscriber identifier is in the TEL URI format and can not be converted into the SIP URI format, sending the SMS message to the SM- SC for transmission;
  converting the MESSAGE request into the SMS message if the MESSAGE request is not in the format of encapsulating the SMS message in the SIP message and the called subscriber identifier is in the TEL URI format and can not be converted into the SIP URI format, sending the SMS message to the SM-SC for transmission.

* * * * *